United States Patent
Backman et al.

(10) Patent No.: US 7,127,597 B2
(45) Date of Patent: Oct. 24, 2006

(54) MECHANISM FOR CONTROLLING BOOT DECISIONS FROM A NETWORK POLICY DIRECTORY BASED ON CLIENT PROFILE INFORMATION

(75) Inventors: Drake Backman, Orem, UT (US); Matthew Lewis, Spanish Fork, UT (US); Stephen Washburn, Lindon, UT (US)

(73) Assignee: Novell, Inc., Provo, UT (US)

(*) Notice: Subject to any disclaimer, the term of this patent is extended or adjusted under 35 U.S.C. 154(b) by 477 days.

(21) Appl. No.: 10/252,554

(22) Filed: Sep. 24, 2002

(65) Prior Publication Data

US 2004/0059900 A1 Mar. 25, 2004

(51) Int. Cl.
- G06F 9/00 (2006.01)
- G06F 9/24 (2006.01)
- G06F 15/177 (2006.01)
- G06F 9/445 (2006.01)
- H03K 19/0175 (2006.01)

(52) U.S. Cl. ............ 713/1; 713/2; 713/100; 326/88; 326/92

(58) Field of Classification Search ............ 713/2
See application file for complete search history.

(56) References Cited

U.S. PATENT DOCUMENTS

| | | | |
|---|---|---|---|
| 6,128,734 A | 10/2000 | Gross et al. | 713/100 |
| 6,158,002 A | 12/2000 | Kwan et al. | 713/2 |
| 6,345,294 B1 | 2/2002 | O'Toole et al. | 709/222 |
| 6,367,074 B1* | 4/2002 | Bates et al. | 711/170 |
| 6,421,777 B1 | 7/2002 | Pierre-Louis et al. | 713/2 |
| 6,425,079 B1 | 7/2002 | Mahmoud | 713/2 |
| 6,507,906 B1* | 1/2003 | Criddle et al. | 713/2 |
| 6,718,462 B1* | 4/2004 | Griffiths et al. | 713/2 |
| 2002/0005276 A1* | 1/2002 | Youssef et al. | 165/110 |
| 2002/0016909 A1* | 2/2002 | Miyajima | 713/2 |
| 2003/0005276 A1* | 1/2003 | French et al. | 713/2 |

FOREIGN PATENT DOCUMENTS

| | | |
|---|---|---|
| GB | 2 311 389 | 9/1997 |
| WO | WO 02/065283 | 8/2002 |

* cited by examiner

Primary Examiner—Lynne H. Browne
Assistant Examiner—Michael J. Brown
(74) Attorney, Agent, or Firm—Pillsbury Winthrop Shaw Pittman, LLP

(57) ABSTRACT

A system and method for controlling boot options for a workstation on a computer network includes initiating a boot on a workstation in communication with the network, downloading an application to the workstation from a server in communication with the network, gathering information about the workstation using the bootstrap code and forwarding the information to a policy server in communication with the network. The system and method also include determining, by the policy server, based on the forwarded information and based on a boot policy stored in a policy directory of the network, at least one boot option for booting the workstation, forwarding the boot option to the workstation, requesting, by the workstation, a boot image corresponding to the boot option, forwarding of the boot image to the workstation and completing the boot of the workstation based upon the boot option received by the workstation.

19 Claims, 4 Drawing Sheets

MECHANISM FOR CONTROLLING BOOT DECISIONS FROM A NETWORK POLICY DIRECTORY BASED ON CLIENT PROFILE INFORMATION

BACKGROUND OF THE INVENTION

1. Field of the Invention

This invention relates to a process and apparatus for booting a workstation, and more particularly, the present invention is directed to controlling PXE based boot decisions from a network directory via a proxy server.

2. Background

PXE is an acronym for Pre-boot Execution Environment, which is a component of Intel®'s Wired For Management (WfM) specification. The PXE model provides computers the ability to load and execute a network bootstrap program (NBP) from a server on the network prior to, or in the alternative, booting the operating system on a local hard drive. PXE is accomplished remotely which eliminates the need for network administrators to visit individual workstation computers.

Using PXE, users at workstations currently may be given the choice of booting to DOS, Windows, or Linux via a query to PXE servers on the network. The PXE servers as a result of the query then forward boot options to the particular workstation performing the query. The boot options are then presented to the user via a simple menu (generally). Upon selection of one of the boot options, a boot image file (called a PXE image) is forwarded to the workstation via the network, at which time the workstation then boots according to the image.

However, the user of the workstation is currently allowed to select which boot option. Accordingly, the user may select an option in which the particular workstation does not have the ability to handle (e.g., lack of sufficient processing power, inability to boot with a specific operating system, and the like), or may choose an option in which the user should not have access to.

Moreover, for many corporate environments, however, it is not desirable to present the user with a choice of boot options but to specify what boot image will be used for a particular workstation.

SUMMARY OF THE INVENTION

The present invention solves the above problems and presents a novel invention which remotely determines boot options for a particular workstation and limits the boot options for users of the workstations pursuant to specified policies set by network administrators and stored in a network directory located preferably in a server on the network. Using a policy server, for example, a determination is made between available boot options for a workstation and the policies set in the network (policy) directory.

Accordingly, in one embodiment of the present invention, a method for controlling boot options for a workstation on a computer network include initiating a boot on a workstation in communication with the network, downloading bootstrap code to the workstation from a server in communication with the network, gathering information about the workstation using the bootstrap code, forwarding the information to a policy server in communication with the network, determining, by the policy server, based on the forwarded information and based on a boot policy stored in a policy directory of the network, at least one boot option for booting the workstation, forwarding the boot option to the workstation, requesting, by the workstation, a boot image corresponding to the boot option, forwarding of the boot image to the workstation and completing the boot of the workstation based upon the boot option received by the workstation.

In another embodiment of the present invention, a system for a performing a method for controlling boot options on a computer network includes initiating means for initiating a boot on a workstation in communication with the network, downloading means for downloading bootstrap code to the workstation from a server in communication with the network, gathering means for gathering information about the workstation using the bootstrap code, forwarding means for forwarding the information to a policy server in communication with the network, determining means for determining, by the policy server, based on the forwarded information and based on a boot policy stored in a policy directory of the network, at least one boot option for booting the workstation, forwarding means for forwarding the boot option to the workstation, requesting means for requesting, by the workstation, a boot image corresponding to the boot option, forwarding means for forwarding of the boot image to the workstation and completing means for completing the boot of the workstation based upon the boot option received by the workstation.

In yet another embodiment of the present invention, a method for controlling boot options on a computer network includes initiating a boot on a workstation in communication with the network, forwarding information about the workstation to a policy server in communication with the network, determining, based on the information, and based on a policy provided in a policy directory of the network, at least one administrator defined boot option for the workstation, forwarding the boot option to the workstation, requesting a boot image corresponding to the boot option, forwarding of the boot image to the workstation and completing the boot of the workstation based upon the boot option received by the workstation.

In still yet another embodiment of the present invention, a method for controlling boot options on a local-area-network (LAN) includes initiating a boot on a workstation in communication with the network, downloading bootstrap code to the workstation from a server in communication with the network, gathering information about the workstation using the bootstrap code, wherein the information includes information related to at least one item selected from the group consisting of: network address, available memory; locally stored programs; processor speed, processor architecture, network connection, display type, peripherals, local date, local time and a user, forwarding the information to a policy server in communication with the network and determining, by the policy server, based on the information, a plurality of boot options for booting the workstation. The boot options are determined based upon the information provided by the workstation and based upon a policy set out in a policy directory of the network. The policy is selected from the group consisting of a time of day, a date, a network address of the workstation, an amount of memory of the workstation, a processor speed of the workstation, a processor type of the workstation and a user. The method according to the present embodiment also includes forwarding the boot options to the workstation, selecting a first boot option from the plurality of boot options for booting the workstation, requesting, by the workstation, a first boot image corresponding to the first boot option, forwarding of the first boot image to the workstation and completing the boot of the workstation based upon the first boot option received by the workstation.

In still yet another aspect of the present invention, a method for controlling boot options on a computer network includes initiating a boot on a workstation in communication with the network, downloading bootstrap code to the workstation from a server in communication with the network, gathering information about the workstation, forwarding the information to a policy server in communication with the network, determining, by the policy server, based on the information and based on a policy set out in a policy directory of the network, an administrator defined boot image option for booting the workstation, forwarding the boot option to the workstation, requesting, by the workstation, of a boot image corresponding to the boot option, forwarding of the boot image to the workstation and completing the boot of the workstation based upon the boot image received by the workstation.

Other embodiments of the present invention include both a computer program product for performing the method according to each of the above stated methods of the previous embodiments and also include a computer readable medium having computer readable instructions provided thereon for enabling a computer to perform one or more of the methods stated in the above embodiments.

These and other objects, features, and advantages of the invention will be apparent through the detailed description of the embodiments which follow and the drawings attached hereto. It is also to be understood that both the foregoing general description and the following detailed description are exemplary and not restrictive of the scope of the invention.

BRIEF DESCRIPTIONS OF THE DRAWINGS

Numerous other objects, features and advantages of the invention should now become apparent upon a reading of the following detailed description when taken in conjunction with the accompanying drawings, in which.

DETAILED DESCRIPTION OF THE EMBODIMENTS

Figure 1:
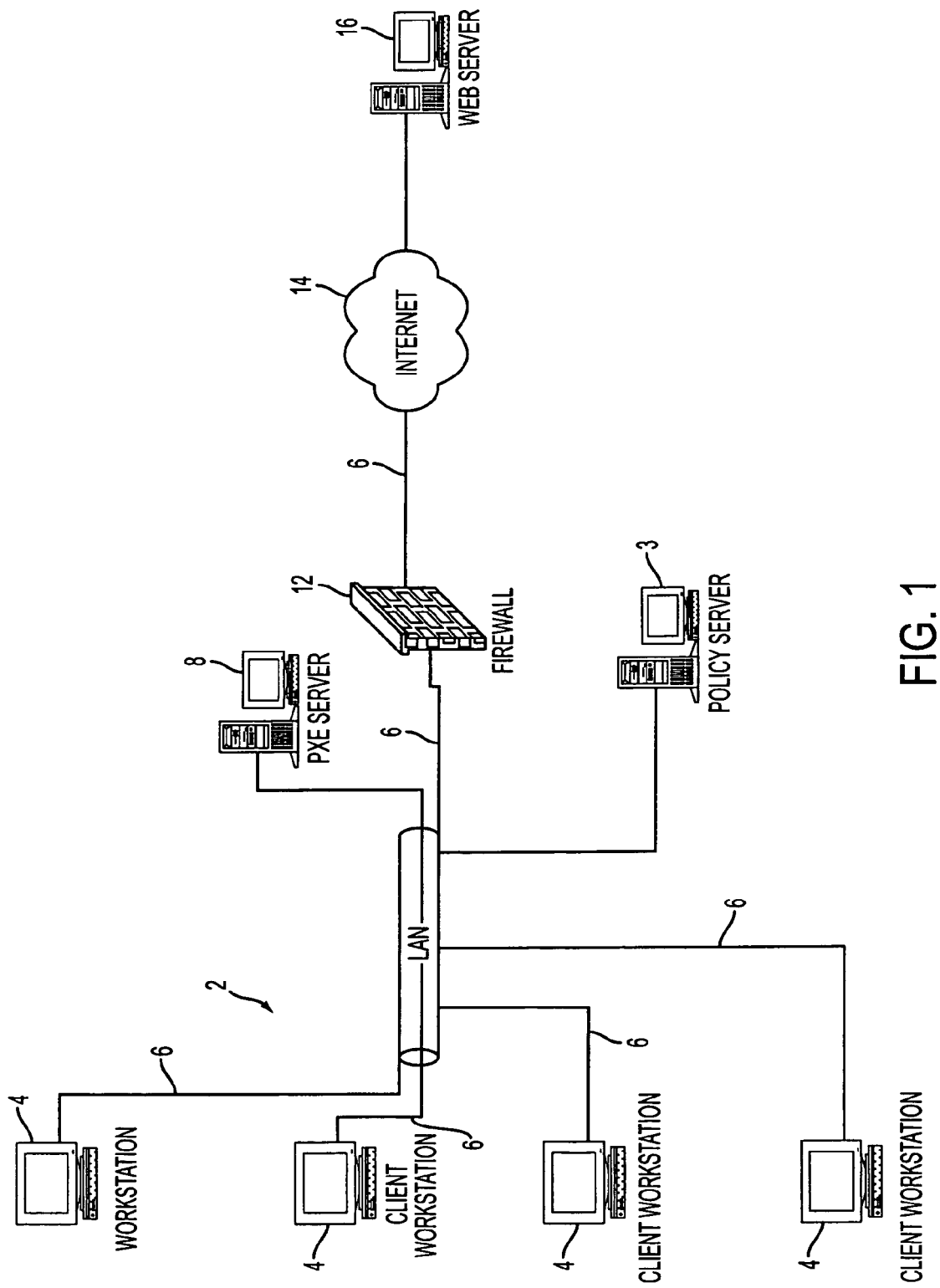
FIG. 1 illustrates a local-area network having a boot option process in a distributed environment according to an embodiment of the present invention.

As shown in FIG. 1, the present invention is used in conjunction with, for example, a Local Area Network (LAN) 2. A plurality of workstation workstations 4 are in communication with the LAN via communication channels 6. The communication channels may include at least one or several forms of available data transfer including wire cable, optical cable, and wireless technologies. Thus, one workstation may be connected via wireless data transfer, and another device of the network (e.g., a server) may be connected via an optical transfer means, for example.

The LAN may be in communication with remote servers 16 via the internet 14. Accordingly, a firewall 12 is preferably used to stop unapproved access to the LAN.

The LAN includes (at least) a management server 8 over the communication channels, such as, for example a PXE server, in accordance with WfM by Intel® (wired for management) the open-industry specification that allows information technology (IT) professionals to automate client-PC management over a network. Accordingly, Intel's®WfM specification (Wired For Management Baseline Version 2.0 and associated upgrades) as well Intel's® Pre-Boot Execution Environment (PXE) Version 2.1, are herein incorporated by reference.

The PXE server manages the pre-boot, execution environment for the workstations and may be combined with the other servers 16 connected to the internet. For illustration purposes, however, the PXE server will be illustrated and explained in combination with the features of the present invention as a separate server.

Figure 2:
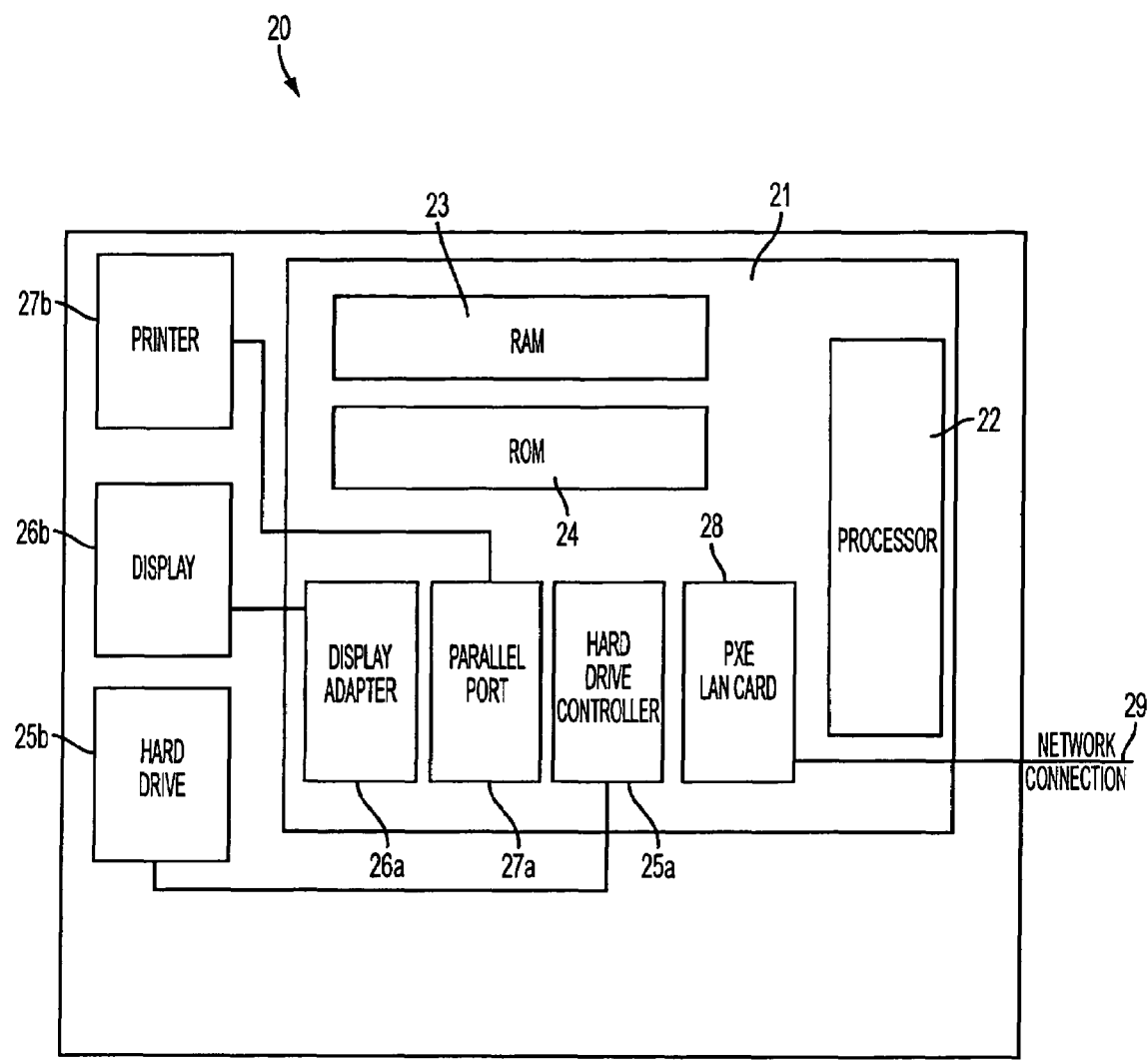
FIG. 2 illustrates an overview of a workstation according to one embodiment of the present invention.

As shown in FIG. 2, a workstation 20 according to the present invention generally includes a motherboard 21 (which preferably supports PXE) having a processor 22, along with RAM memory 23, and ROM memory 24. The motherboard also generally includes controller hardware for controlling associated and peripheral devices including a hard drive controller 25a for controlling hard drive 25b, display controller (adapter) 26a for controlling a display 26b, and a parallel port 27a for controlling a printer 27b. The workstation 20 also preferably includes a PXE-enabled hardware configured to be used as a boot mechanism. Accordingly, the PXE-enabled hardware may include a LAN card 28 with a PXE BIOS inserted in, for example, a PCI slot on the motherboard. The LAN card allows the workstation to communicate with the LAN via a network connection 29 (i.e., fixed line or wireless). One of skill in the art will appreciate that the processes performed by the PXE hardware may be performed by software operated on the workstation upon starting the workstation.

Figure 3:
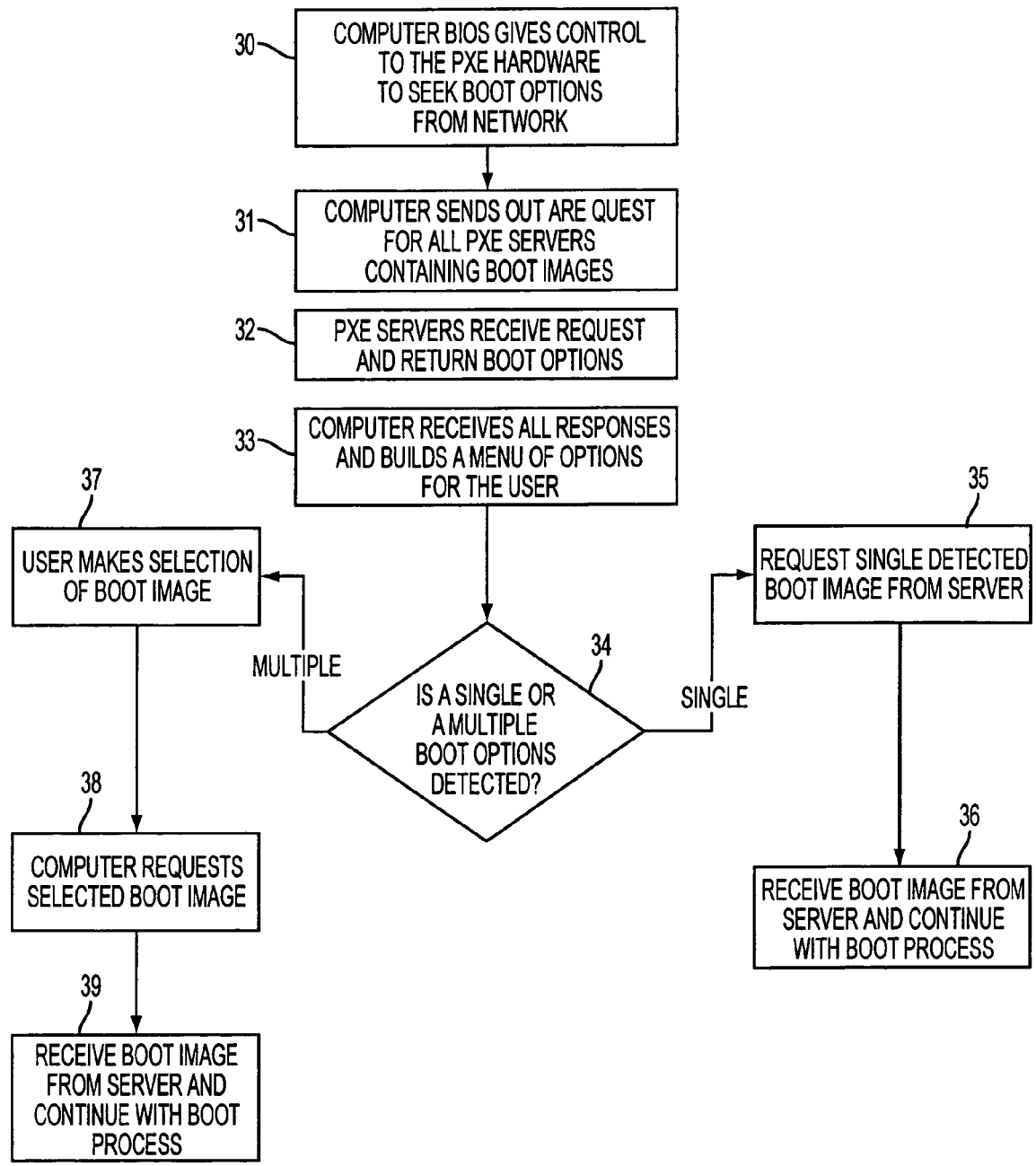
FIG. 3 illustrates a flow diagram for a boot option process according to one embodiment of the present invention.

Generally, a PXE process for delivering a boot image proceeds as follows according to FIG. 3. The workstation BIOS gives control of boot process to the PXE hardware (30), which then seeks boot options from the network using, for example, a proxy server via the communication lines. To find the boot options, the PXE hardware sends out a request (31) on the network for boot images to all PXE servers containing boot images.

The available servers receive the request and return boot options to the workstation (32), upon which the workstation receives responses (33). If only a single boot option is detected, then the workstation requests the corresponding boot image from the network (e.g., the corresponding PXE server which forwarded the option). The image is then forwarded from a server to the workstation which continues with the workstation's boot process according to the received image (34–36).

However, if multiple boot options are detected, then a menu of options is built for the user of the workstation and the user selects one of the options. Thus, the workstation requests the boot image from the PXE server associated with a selected option. When the boot image is received from the PXE server, the boot process continues according to the received image (34, 37–39).

Figure 4:
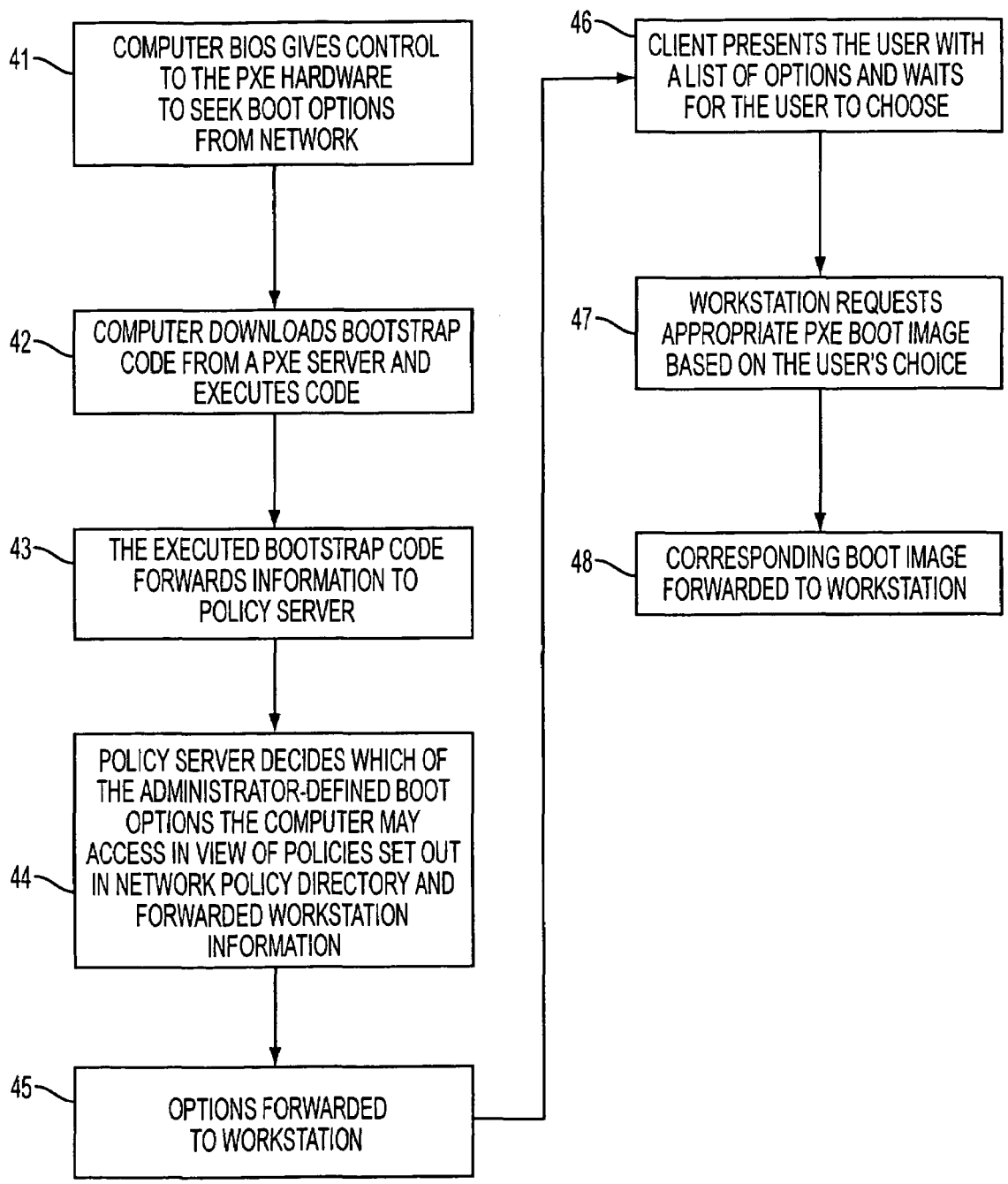
FIG. 4 illustrates a illustrates a flow diagram for a boot option process according to another embodiment of the present invention.

In one embodiment of the present invention, the LAN includes preferably a single PXE server for responding to requests by workstations for boot options and/or images. A process according to this embodiment is illustrated in FIG. 4, for example. This process makes use of network defined policies for booting workstations on the network. Such network defined policies may be stored on Network Policy Directory on a Policy Server 3 on the LAN, or may be stored in any one or more of the servers in communication with the LAN, including the remote web server 16, in communication with the LAN via the internet. The Network Policy Directory allows network administrators to define various boot options based on the policies (rules) set out in the Network Policy Directory for presentation to a user of the workstation. Each option has a corresponding PXE boot image which is forwarded to the workstation after the user selects the option (if there is more than one option available).

According to this embodiment, the workstation turns over control of the boot process to the PXE hardware (41). At that point, the PXE hardware on the workstation preferably downloads bootstrap code from the network (e.g., from the PXE server or other specified location; such code may be, for example, a Di-NIC client from Preworx). The bootstrap code is then executed by the workstation (42).

The bootstrap code directs the workstation to pass along information about the workstation to the Policy Server (43). The information may include any workstation specific information including workstation hardware architecture and capabilities, workstation name and/or network address, peripheral information, as well as user information (current user, assigned users, and the like), name and context of a directory object associated with the workstation and the name of the directory tree where the object resides.

Based upon the information forwarded by the workstation, and the information in the Network Policy Directory, the Policy Server determines (44) which administrator defined boot options may be used with the workstation being booted up. This determination, for example, may be based on a particular predetermined factor, or a plurality of factors, as established by the policies in the Network Policy Directory.

Once the determination is made, at least one option or a list of options may be produced for the particular workstation. The option(s) is then forwarded (45) back to the workstation for selection (of the boot option) by the user of the workstation (46–47). In one embodiment of the present invention, only a single boot option may be available for the workstation according to the predetermined policies on the Network Policy Directory and rather than forward the option to the workstation, the boot image may be forwarded directly to the workstation instead. Thus, the workstation receives the boot image and proceeds with booting the workstation (48) without user intervention.

However, if the Policy Server determines that there are no available boot options for the particular workstation requesting such, then no options or images may be returned to the workstation and, thus, the workstation then boots with the next BIOS defined boot device (e.g., a hard drive, floppy drive, CD drive, and the like).

The Policy Server makes the determination on which boot options to return to the workstation based upon predetermined rules contained in the Network Policy Directory. The boot-up management directory includes the policies (conditions) for which boot images are forwarded to which workstations. For example, such conditions may be established which allow certain workstations to boot for a single time (according to one image) to perform a specific task. Thereafter, all subsequent boot-ups may bring up a user's production computer environment on the workstation. The determination may also be made, alternatively or in addition to the above information, through a membership to an e-directory group.

Alternatively, instead of the Policy Server consulting the Network Policy Directory, the Policy Server may pass the information produced by the workstation to a custom built module (which may reside with the any one of the servers on/off the network) that then queries the Network Policy Directory. The module uses the information and the various objects and policies in the Network Policy Directory to determine an appropriate boot option(s) to forward to the workstation.

Boot options, for example, may include one time boot options for specific tasks to be completed on the workstation computer. Examples of such one-time tasks include: a DOS session to update the workstation's BIOS or to run an in-house inventory application; booting into LINUX to perform a hard drive imaging, booting to execute custom applications, and the like Another specific boot option may include forwarding a boot image to boot the workstation with a limited operating system to initiate the installation of a more powerful operating system. For example, the workstation may be forwarded a boot image for booting the workstation into a DOS session for initiating the installation of Netware.

Boot-up policies may include a policy changing the boot image depending upon the time of day when the workstation boots up. For example, when the workstation boots up during regular business hours, a boot option for normal production environment is invoked. However, when the workstation is booted after hours, for example, the boot image would provide boot instructions for a limited system, or booting of the workstation may be disallowed altogether.

Still yet other policies may include forwarding boot options/images for booting into different environments and disallowing boot-up into specific environments based on predetermined factors, e.g., time of day (see above), and a detected change of components (e.g., swapping of LAN cards) and imposing extra steps in the boot process. For example, each time the workstation boots, the first boot may boot the workstation in to a special environment to gather inventory information, then reboot into a production operating system. Each subsequent boot may also be tracked by the Network Policy Directory.

Accordingly, it is a feature of the present invention to removes control from the user of the workstation, and place it in the hands of the system administrator(s). Thus, instead of the boot-time decisions being made by the end user, it is the system administrator who creates, manages and maintains the policies in a network boot directory.

Having now described a few embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention as defined by the appended claims and equivalents thereto. The contents of all references cited in this application are hereby incorporated by reference. The appropriate components, processes, and methods of those documents may be selected for the present invention and embodiments thereof.

What is claimed is:

1. A method for controlling boot options for a workstation on a computer network comprising:

initiating a boot on the workstation in communication with the network;

downloading a boot application to the workstation from a server in communication with the network, using the boot application to gather information about the workstation;

forwarding the information to a policy server in communication with the network;

determining, by the policy server, based on the forwarded information and based on a boot policy stored in a policy directory of the network, two or more boot options for booting the workstation wherein each boot option enables the workstation to boot into a specified environment based on one or more predefined features;

forwarding the two or more boot options to the workstation;

enabling a user to select a boot option from the two or more boot options;

receiving, from the workstation, the user selection of a boot option and a request for a boot image corresponding to the user selection;

forwarding the requested boot image to the workstation based on the selected boot option; and completing the boot of the workstation based upon the boot image received by the workstation.

2. The method according to claim 1, wherein the information comprises a network address.

3. The method according to claim 1, wherein the information includes information related to at least one item selected from the group consisting of: available memory; locally stored programs; processor speed, processor architecture, network connection, display type, peripherals, local date, local time and a user.

4. The method according to claim 1, wherein a plurality of boot options are available and forwarded to the workstation, and wherein prior to requesting the boot image for a boot option, the method further comprises:

presenting a user of the workstation with the plurality of boot options; and selecting one of the options by the user, wherein the workstation requests the boot image corresponding to the selected boot option.

5. The method according to claim 1, wherein the boot option forwarded to the workstation is dependent upon a condition.

6. The method according to claim 5, wherein the condition is selected from the group consisting of: a time of day, a date, a network address of the workstation, an amount of memory of the workstation, a processor speed of the workstation, a processor type of the workstation and a user.

7. The method according to claim 1, wherein the boot option comprises performing a specific task.

8. The method according to claim 5, wherein the boot option comprises performing a specific task based upon the condition.

9. The method according to claim 7, wherein the specific task is selected from the group consisting of: a DOS session to update a BIOS of the workstation, a LINUX boot to perform drive imaging, and booting the workstation with a limited operating system to initiate the installation of another operating system.

10. The method according to claim 1, wherein the workstation comprises a personal computer.

11. The method according to claim 1, wherein the network comprises a local-area-network (LAN).

12. The method according to claim 1, wherein the network comprises a wide-area-network (WAN).

13. The method according to claim 1, wherein the network comprises the internet.

14. A computer program product, stored on a computer readable medium, for performing a method for controlling boot options comprising:

initiating a boot on a workstation in communication with the a network;

downloading bootstrap code to the workstation from a server in communication with the network, using the bootstrap code to gather information about the workstation;

forwarding the information to a policy server in communication with the network;

determining, by the policy server, based on the forwarded information and based on a boot policy stored in a policy directory of the network, two or more boot options for booting the workstation;

forwarding the two or more boot options to the workstation;

enabling a user to select a boot option from the two or more boot options;

receiving, from the workstation, the user selection of a boot option and a request for a boot image corresponding to the user selection;

forwarding the requested boot image to the workstation based on the user selection; and completing the boot of the workstation based upon the boot image received by the workstation.

15. A computer readable medium having provided thereon computer instructions for a method for controlling boot options on a computer network comprising:

initiating a boot on a workstation in communication with the network;

downloading bootstrap code to the workstation from a server in communication with the network, gathering information about the workstation using the bootstrap code;

forwarding the information to a policy server in communication with the network;

determining, by the policy server, based on the forwarded information and based on a boot policy stored in a policy directory of the network, two or more boot options for booting the workstation;

forwarding the two or more boot options to the workstation;

enabling a user to select a boot option from the two or more boot options;

receiving, from the workstation, the user selection of a boot option and a request for a boot image corresponding to the user selection;

forwarding the requested boot image to the workstation; and completing the boot of the workstation based upon the boot image received by the workstation.

16. A system for a performing a method for controlling boot options on a computer network comprising:

initiating means for initiating a boot on a workstation in communication with the network;

downloading means for downloading bootstrap code to the workstation from a server in communication with the network, gathering means for gathering information about the workstation using the bootstrap code;

forwarding means for forwarding the information to a policy server in communication with the network;

determining means for determining, by the policy server, based on the forwarded information and based on a boot policy stored in a policy directory of the network, two or more boot options for booting the workstation;

forwarding means for forwarding the two of more boot options to the workstation;

requesting means for requesting, by the workstation, a boot image corresponding to the boot option;

enabling means for enabling a user to select a boot option from the two or more boot options;

receiving means for receiving, from the workstation, the user selection of a boot option and a request for a boot image corresponding to the user selection;

forwarding means for forwarding the requested boot image to the workstation; and completing means for completing the boot of the workstation based upon the boot image received by the workstation.

17. A method for controlling boot options on a computer network comprising:

initiating a boot on a workstation in communication with the network;

forwarding information about the workstation to a policy server in communication with the network;

determining, based on the information, and based on a policy provided in a policy directory of the network, two or more administrator defined boot options for the workstation;

forwarding the two or more boot options to the workstation;

enabling a user to select a boot option from the two or more boot options;

receiving, from the workstation, the user selection of a boot option and a request for a boot image corresponding to the user selection;

forwarding the requested boot image to the workstation; and completing the boot of the workstation based upon the boot image received by the workstation.

18. A method for controlling boot options on a local-area-network (LAN) comprising:

initiating a boot on a workstation in communication with the network;

bootstrap code to the workstation from a server in communication with the network, gathering information about the workstation using the bootstrap code, wherein the information includes information related to at least one item selected from the group consisting of: network address, available memory; locally stored programs; processor speed, processor architecture, network connection, display type, peripherals, local date, local time and a user;

forwarding the information to a policy server in communication with the network;

determining, by the policy server, based on the information, a plurality of boot options for booting the workstation, wherein the boot options are determined based upon the information provided by the workstation and based upon a policy set out in a policy directory of the network, and wherein the policy is selected from the group consisting of a time of day, a date, a network address of the workstation, an amount of memory of the workstation, a processor speed of the workstation, a processor type of the workstation and a user;

forwarding the plurality of boot options to the workstation;

selecting a first boot option from the plurality of boot options for booting the workstation;

requesting, by the workstation, a first boot image corresponding to the first boot option;

forwarding of the first boot image to the workstation; and completing the boot of the workstation based upon the first boot image received by the workstation.

19. A method for controlling boot options on a computer network comprising:

initiating a boot on a workstation in communication with the network;

downloading bootstrap code to the workstation from a server in communication with the network, gathering information about the workstation;

forwarding the information to a policy server in communication with the network;

determining, by the policy server, based on the information and based on a policy set out in a policy directory of the network, two or more administrator defined boot options for booting the workstation;

forwarding the two or more boot options to the workstation;

enabling a user to select a boot option from the two or more boot options;

receiving, from the workstation, the user selection of a boot option and a request for a boot image corresponding to the user selection;

forwarding the requested boot image to the workstation; and completing the boot of the workstation based upon the boot image received by the workstation.

* * * * *